United States Patent [19]
St. Ours

[11] Patent Number: 6,129,350
[45] Date of Patent: Oct. 10, 2000

[54] TIMING BELT WITH PRODUCT HANDLING MECHANISM

[75] Inventor: Joseph Adrian St. Ours, Lee, N.H.

[73] Assignee: Heidelberger Druckmaschinen AG, Heidelberg, Germany

[21] Appl. No.: 09/265,477

[22] Filed: Mar. 10, 1999

[51] Int. Cl.[7] .......................... B65H 29/04; B41L 43/00; B65G 39/20
[52] U.S. Cl. .......................... 271/204; 270/32; 198/845; 198/678.1; 198/644; 198/803.9; 198/803.3
[58] Field of Search ................. 198/845 C, 847, 198/834, 678.1 C, 644 C, 803.7 C, 803.9 C, 803.3 C, 845, 678.1, 644, 803.9, 803.3; 270/52.08, 32 C; 271/204 D

[56] References Cited

U.S. PATENT DOCUMENTS

| | | |
|---|---|---|
| 4,373,710 | 2/1983 | Hansen et al. .................. 270/55 X |
| 4,972,234 | 11/1990 | Tanaka et al. .................. 355/309 X |
| 5,390,600 | 2/1995 | Thünker . |
| 5,447,302 | 9/1995 | Curley . |
| 5,511,670 | 4/1996 | Damarest et al. .................. 209/540 X |
| 5,566,614 | 10/1996 | Ganter . |
| 5,772,391 | 6/1998 | Sjogren et al. .................. 414/790.9 X |

FOREIGN PATENT DOCUMENTS

| | | |
|---|---|---|
| 0890532A1 | 1/1999 | European Pat. Off. . |
| 19806172A1 | 10/1998 | Germany . |

*Primary Examiner*—Christopher P. Ellis
*Assistant Examiner*—Kenneth W Bower
*Attorney, Agent, or Firm*—Herbert L. Lerner; Laurence A. Greenberg; Werner H. Stemer

[57] ABSTRACT

A timing belt is formed with a tensile member and a plurality of teeth which mesh with a sprocket wheel. One or more of the teeth are formed with an opening and a product processing device is mounted on the timing belt and attached via the opening in the tooth. The timing belt is preferably an endless belt and the teeth define an inner running surface. Grippers or similar product processing devices may be mounted on the belt so as to be pivotable about an axis through the openings in the teeth.

11 Claims, 4 Drawing Sheets

TIMING BELT WITH PRODUCT HANDLING MECHANISM

BACKGROUND OF THE INVENTION

1. Field of the Invention:

The invention lies in the mechanical arts dealing with high-speed and timed product transfer and processing, and it is particularly suited to application in the printing field. Specifically, the invention relates to product transfer and product handling in high-speed folders, to timed signature transfer applications, and to web handling systems in printing presses.

2. Description of the Related Art:

Printing product must be transported in printing presses with accurate timing and proper speed. For instance, grippers are utilized to positively grip and feed single sheets into a sheet-fed printing unit. Timed grippers may also be used at the transfer points between individual printing units and at the delivery end for handling the individual signatures at the folder and/or at the stacker. Gripper systems are also used in web-fed rotary printing presses, for instance during make-ready to feed the web into the machine.

Various transfer devices, such as deliveries, carry the grippers on chains. The grippers are thereby disposed on gripper carriages of endlessly revolving chains. The grippers are typically timed and actuated in that a cam roller runs onto a gripper opening cam as the chain revolves around its track. These systems are similarly timed in the folders following the printing units in the product transport direction. The printed signature must thereby be folded at the speed of the upstream printing units and it is paramount that the signature be gripped and transported through the folder in a properly timed and controlled manner.

The chains in such gripper chain mechanisms tend to have a speed limiting effect and they require a high degree of maintenance. The chains typically require lubrication to ensure smooth and quiet operation.

It has been proposed to replace the chains in gripper transport systems with belts, typically urethane timing belts with weld-on profile. While the urethane belts provide several advantages over the chain systems, such belts are also limited with regard to their useable speed. The weld joint between the timing belt and the profile is substantially limited to a low tensile strength.

In the ever increasing speed of printing presses and related product handling apparatus, the speed of the gripper systems is a parameter of substantial importance. Also, proper tensile strength of the belts used in the systems is very important since any belt breakage can lead to a temporary shutdown of the printing press.

SUMMARY OF THE INVENTION

It is accordingly an object of the invention to provide a timing belt with a paper handling mechanism, which overcomes the above-mentioned disadvantages of the heretofore-known devices and methods of this general type and which provides for improved timed and controlled high speed gripping and transportation of product in a printing press with the reduced maintenance attendant to urethane timing belts, yet with proper tensile strength.

With the foregoing and other objects in view there is provided, in accordance with the invention, a timing belt assembly, comprising:

a timing belt formed with a tensile member having an upper surface and a plurality of teeth opposite the upper surface of the tensile member;

at least one of the teeth having an opening formed therein; and a product processing device mounted on the timing belt.

In accordance with an added feature of the invention, the timing belt is an endless belt with the teeth defining an inner running surface of the belt, and including a sprocket pulley deflecting the belt and meshing with the teeth of the endless belt.

In accordance with another feature of the invention, the product processing device is a gripper member pivotally mounted on the belt about a pivot axis extending through the opening.

In accordance with an alternative embodiment of the invention, the product processing device is a pin array in a device for transporting printing product, a tucker blade in a folder of a paper processing device, or a pair of jaws in a folder of a paper processing device, such as a folder of a printing machine.

In accordance with a further feature of the invention, the opening is a throughhole extending completely through the at least one tooth. A bearing pin can thus be inserted in the throughhole and the processing device can be mounted on the portions of the pin which project laterally from the belt.

In accordance with again an added feature of the invention, a pair of flanged guide rolls are disposed laterally of the belt, opposite one another, and straddling the belt. The two guide rolls are preferably rotated about a common axis. The guide rolls keep the tracking of the belt accurate and thus obviate tracking flanges on the pulley or similar tracking facilitators.

In accordance with again an additional feature of the invention, a bearing pin extends through the throughhole and defines the common axis about which the flanged guide rolls rotate.

In accordance with again another feature of the invention, two frame plates are disposed laterally of and parallel to the belt. The frame plates are each formed with a guide track supporting the flanged guide rolls.

In accordance with again a further feature of the invention, the product processing device is a gripper pivotally mounted about an axis defined by the opening in the at least one tooth, the gripper having a gripper lever and a cam follower mounted on the gripper lever, and including a cam track mounted adjacent a run of the belt for inducing the gripper to selectively assume an open position and a closed position as the cam follower runs on the cam track.

In accordance with a concomitant feature of the invention, the gripper is a spring-loaded gripper biased into a closed position. Alternatively, the cam track may be a two-surface track with a first camming surface forcing the gripper into the closed position and a second camming surface forcing the gripper into the open position.

The primary advantages of the invention are found in the fact that there is provided timed, controlled, low maintenance, high speed gripping and transportation through various parts of a printing machine (e.g. through a folder), along a linear, curvilinear or combination path. The entire device is thereby disposed within a very compact envelope.

Other features which are considered as characteristic for the invention are set forth in the appended claims.

Although the invention is illustrated and described herein as embodied in a timing belt with a product handling mechanism, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
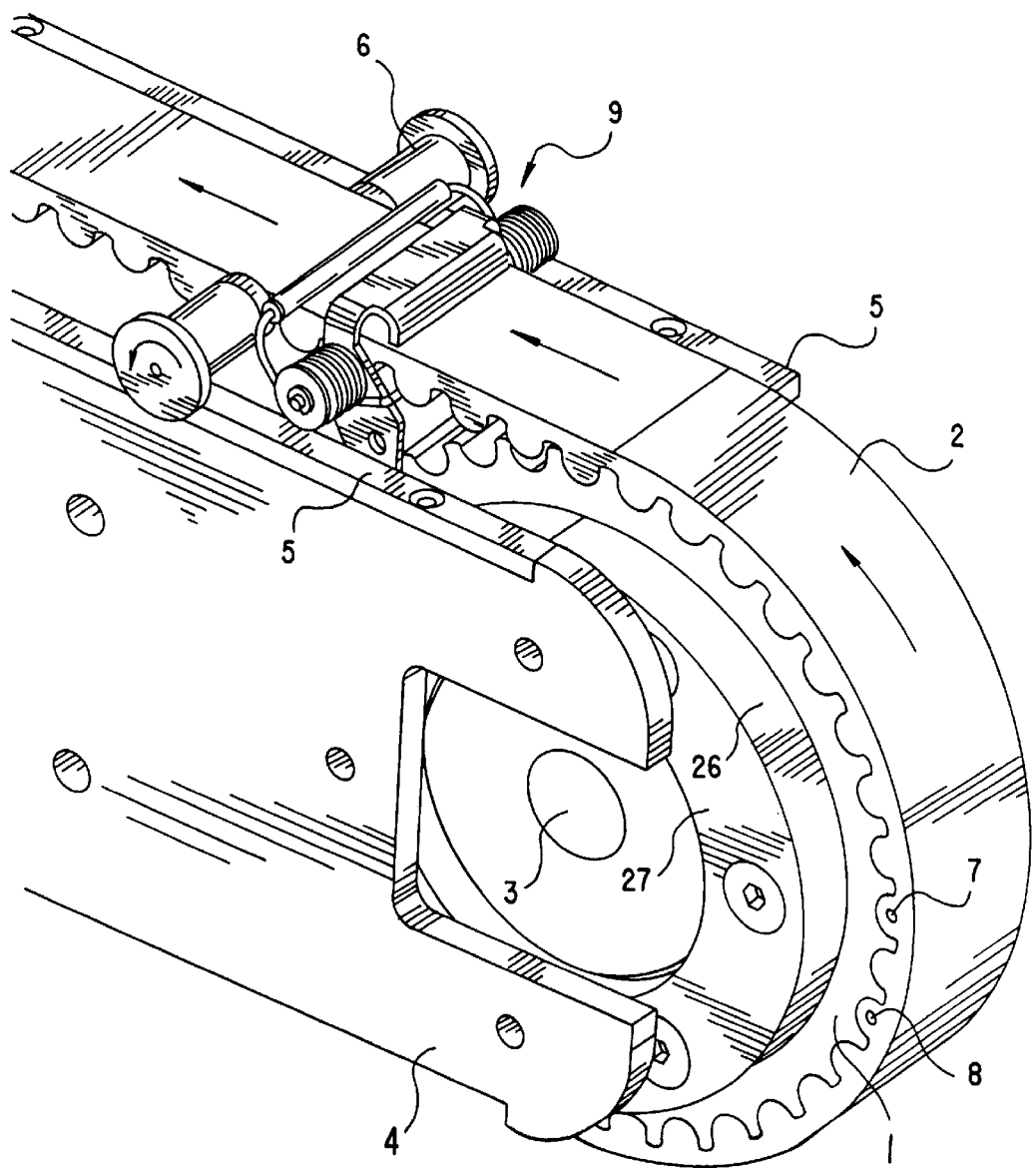
FIG. 1 is a perspective view of a timing belt gripper mechanism as the belt is deflected by a pulley.

Referring now to the figures of the drawing in detail and first, particularly, to FIG. 1 thereof, there is seen a timing belt gripper mechanism which is usable, for instance, in a folder of a printing press, in a sheet feeder of a sheet-fed printing press, or as a web-up device in a web-fed printing press. A timing belt 2 is deflected around a sprocket pulley 1 in a direction indicated by the arrows. The pulley 1 rotates about an axle 3 which is stationary with regard to two frame plates 4. The frame plates 4 are formed with guide tracks 5 on which flanged guide rolls 6 roll to keep the tracking of the belt 2. The guide rolls 6 thus obviate tracking flanges on the pulley 1 or similar tracking facilitators. The belt 2 is formed with openings 7 and 8 which, as will be explained in the following text, allow the mounting of various devices. The devices mounted on the belt 2 in FIG. 1 are the flanged guide rolls 6 and a gripper 9.

The holes 7, 8 may be drilled or molded into the tooth profile of the belt 2. Plane bearings can be pressed into the hole to provide a low friction pivot or mounting joint. The holes 7 and 8, and thus any device mounted thereon, is synchronously driven throughout the belt path.

Figure 2:
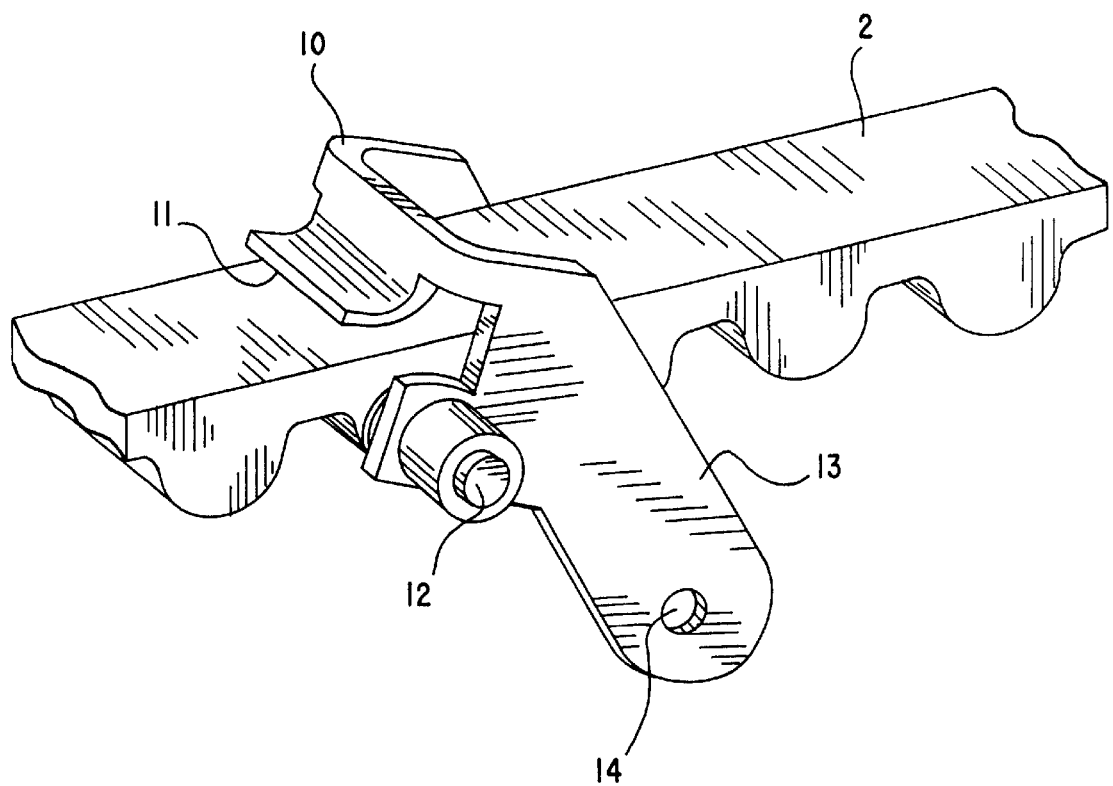
FIG. 2 is a perspective view of belt section with a gripper element pivotally mounted on the belt.

With reference to FIG. 2, a gripper element 10 is mounted on the belt 2 so as to be articulated on a pin shaft 12. The gripper element 10, as in FIG. 1, belongs to a conventional spring-loaded and cam driven gripper 9. The gripper element 10 has a pivot lever 13 formed with a lever hole 14 at a free end thereof. Clockwise pivoting of the pivot lever 13 (caused by a cam-induced downward motion of the lever hole 14) would cause the gripper to open and counterclockwise pivoting of the lever 13 would cause the gripper 9 to close by clamping a gripper seat 11 downward against the top surface of the belt 2.

Figure 3A:
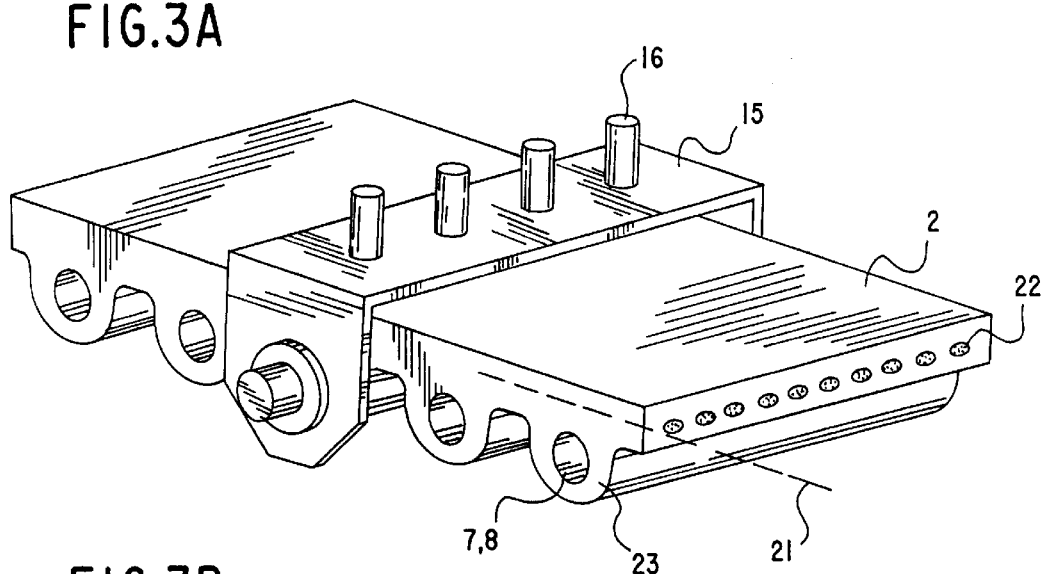
FIGS. 3A to 3C similar perspective views showing various product processing devices mounted on a belt.
Figure 3B:
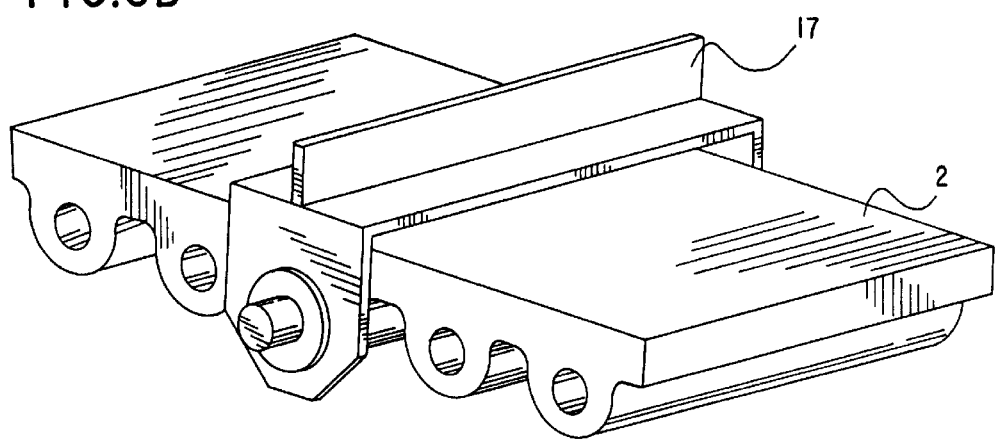
Figure 3C:
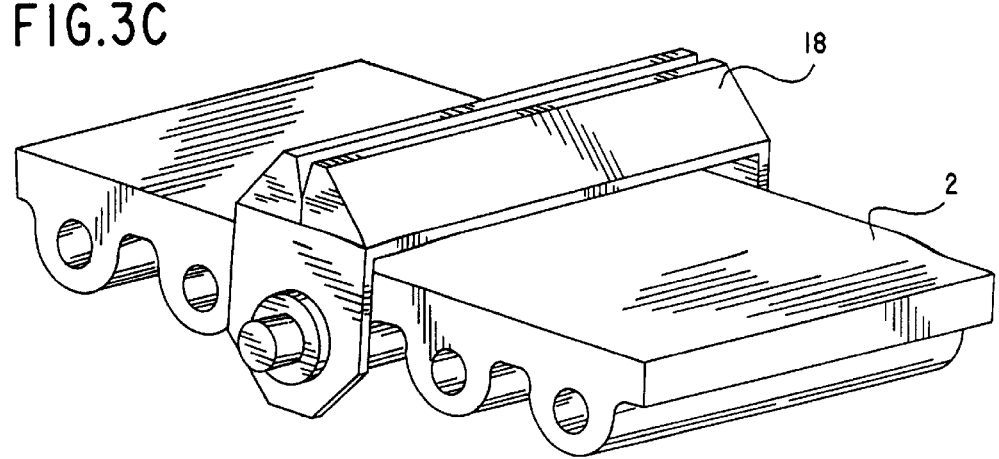

With reference to FIGS. 3A to 3C, various devices may be mounted on the timing belt 2. For instance, the belt 2 of FIG. 3A carries a pin array 15 with a plurality of mutually aligned pins 16. The belt 2 of FIG. 3B carries a tucker blade 17, and the belt 2 of FIG. 3C carries a pair of jaws. It is clear from these illustrations that the novel timing belt is applicable not only to grippers, but any type of device in a product handling system where timed high-speed processing is required.

Figure 4:
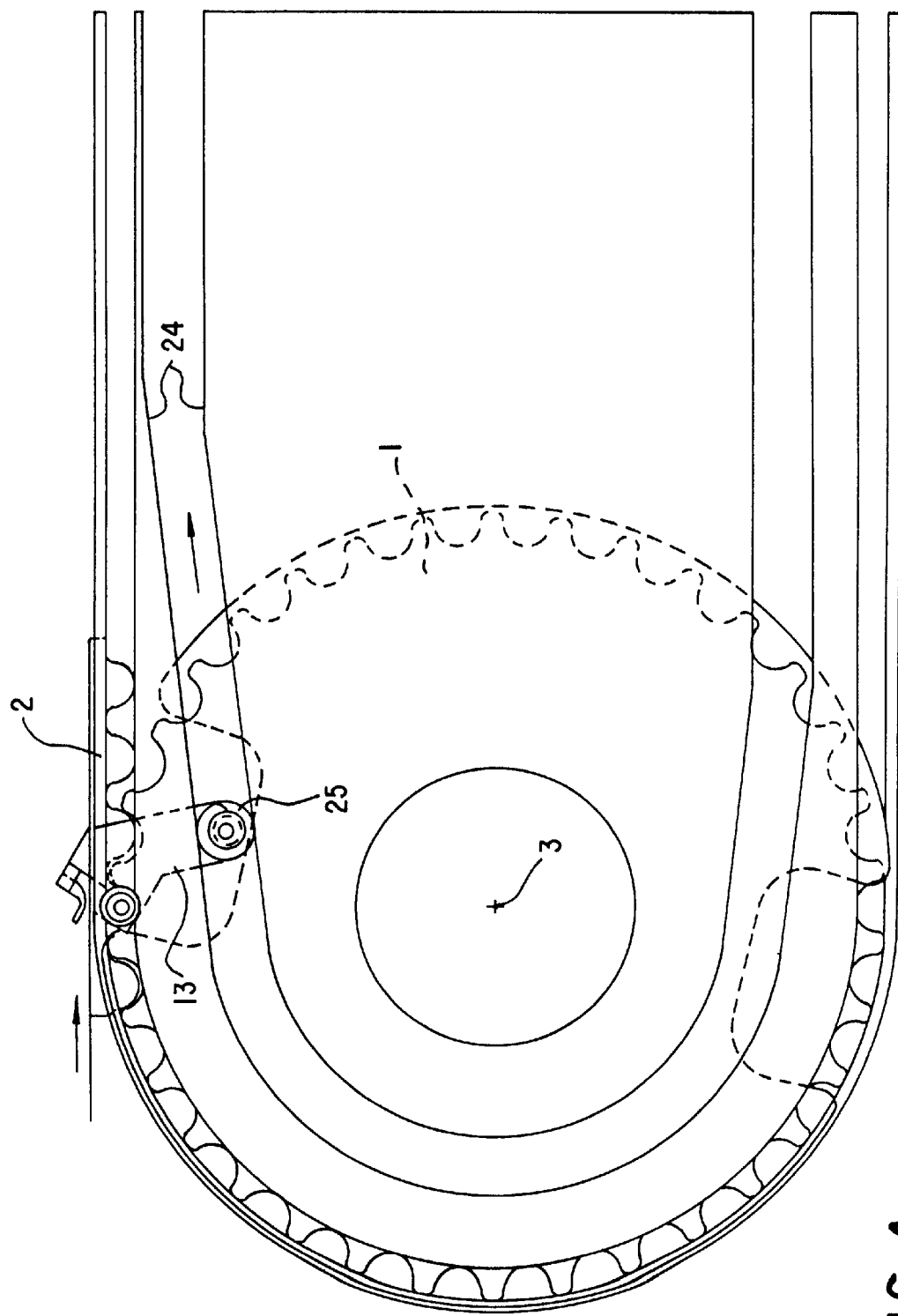
FIG. 4 is a diagrammatic side-elevational view of a cam driven gripper mounted on a timing belt according to the invention.

Timing belts and matching sprocket pulleys may be commercially obtained, for instance, from The Gates Rubber Company, Denver, Col. The timing belts sold by Gates® are referred to as HTD® belts and are available in various sizes and dimensions. Such belts are primarily defined by the belt pitch (the distance between adjacent tooth centers measured along the pitch line), the belt pitch length (total length of the belt measured along the pitch line), and the belt width. With reference to FIG. 3A, the (theoretical) pitch line 21 of the belt lies within a tensile member 22 (belt cord). As the belt 2 lies on the sprocket pulley 1, the pitch line 21 lies outside the outer diameter of the sprocket pulley 1. The openings 7, 8 are drilled centrally in the teeth 23 of the belt 2. The teeth 23 have a semi-circular contour, with flat segments defined by the tensile member 22 in between. The openings 7, 8 do not reduce the tensile strength of the belt 2. Furthermore, the pivot point about which the gripper member 10 is articulated lies centrally within the respective belt tooth 23 and it is therefore substantially below the pitch line 21 (by approximately a tooth radius). In curvilinear terms, the line along which the pivot point travels lies well inside the pitch radius or pitch diameter of the sprocket pitch circle, which substantially coincides with the pitch line 21. This leads to a very compact envelope without impairing the tensile strength of the belt 2. In returning to the gripper example, reference will now be had to FIG. 4. A cam track 24 is mounted adjacent the pulley 1 and just outside the belt track. A cam follower 25, which is mounted on the gripper lever 13 travels along the cam track 24. Due to the fact that the cam track 24 positively defines the position of the lever 13, it is not necessary to provide spring loading for the gripper element of FIG. 4. In contrast, the gripper 9 of FIG. 1 is spring-loaded into its clamping position. It therefore suffices to provide only one camming surface 26, which causes the gripper 9 to open while it travels about the sprocket pulley 1. In the case of FIG. 1, furthermore, the surface 26 is formed on a ring member 27 that is rigidly mounted on the pulley 1. The surface 26 could also be attached to the side frame 4 or driven independently.

As noted above, the system is widely applicable to high-speed, timed product handling. The preferred embodiments illustrated herein should not be understood to limit the inventive scope in any way. Advantageous embodiments include timing belt gripper mechanisms for positively gripping and feeding single sheet products into a sheet fed printing machine and a gripper mechanism used as a web-up device with which a web is fed through a web-fed printing press during make-ready. Due to the flexibility of the timing belt, the system may be twisted or bent through space. This allows product to be slaved along various conceivable, non-traditional belt paths. It is common to all applications that the timing belt allows for smooth, timed, low maintenance, high speed control of product through some distance and in a compact envelope.

I claim:

1. A timing belt assembly, comprising:
   a timing belt formed with a tensile member having an upper surface and a plurality of teeth opposite said upper surface of said tensile member;
   at least one of said teeth having an opening formed substantially parallel to said upper surface therein; and
   a product processing device mounted on said timing belt.

2. The assembly according to claim 1, wherein said timing belt is an endless belt with said teeth defining an inner running surface of said belt, and including a sprocket pulley deflecting said belt and meshing with said teeth of said endless belt.

3. The assembly according to claim 1, wherein said product processing device is a gripper member pivotally mounted on said belt about a pivot axis extending through said opening.

4. The assembly according to claim 1, wherein said product processing device is a pin array in a device for transporting printing product.

5. The assembly according to claim 1, wherein said opening is a throughhole extending through said at least one of said teeth, and including a bearing pin extending through said throughhole.

6. The assembly according to claim 1, which further comprises a pair of flanged guide rolls disposed laterally of said belt, opposite one another, and rotatably mounted about a common axis.

7. The assembly according to claim 6, wherein said opening is a throughhole extending through said at least one of said teeth, and including a bearing pin extending through said throughhole and defining said common axis about which said flanged guide rolls rotate.

8. The assembly according to claim 7, which further comprises two frame plates disposed laterally of and parallel to said belt, said frame plates each being formed with a guide track supporting a respective one of said flanged guide rolls.

9. The assembly according to claim 1, wherein said product processing device is a gripper pivotally mounted about an axis defined by said opening in said at least one of said teeth, said gripper having a gripper lever and a cam follower mounted on said gripper lever, and including a cam track mounted adjacent a run of said belt for inducing said gripper to selectively assume an open position and a closed position as said cam follower runs on said cam track.

10. The assembly according to claim 9, wherein said gripper is a spring-loaded gripper biasing said gripper into a closed position.

11. The assembly according to claim 9, wherein said cam track is a two-surface track with a first camming surface forcing said gripper into the closed position and a second camming surface forcing said gripper into the open position.

* * * * *